(12) United States Patent
Chen et al.

(10) Patent No.: US 9,330,139 B2
(45) Date of Patent: May 3, 2016

(54) AUTOMATIC REUSE OF USER-SPECIFIED CONTENT IN QUERIES

(75) Inventors: Li Chen, San Jose, CA (US); Ankur Aggarwal, Redwood City, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 646 days.

(21) Appl. No.: 12/646,665

(22) Filed: Dec. 23, 2009

(65) Prior Publication Data

US 2011/0119287 A1 May 19, 2011

Related U.S. Application Data

(60) Provisional application No. 61/262,332, filed on Nov. 18, 2009.

(51) Int. Cl.
*G06F 17/30* (2006.01)

(52) U.S. Cl.
CPC .... *G06F 17/30448* (2013.01); *G06F 17/30522* (2013.01)

(58) Field of Classification Search
USPC .................................. 707/758, 768, 779, 734
See application file for complete search history.

(56) References Cited

U.S. PATENT DOCUMENTS

| | | | |
|---|---|---|---|
| 6,285,998 B1 | 9/2001 | Black et al. | |
| 6,366,915 B1 * | 4/2002 | Rubert et al. | ................. 707/770 |
| 6,801,906 B1 | 10/2004 | Bates et al. | |
| 8,140,563 B2 * | 3/2012 | Midgley | ............ G06F 17/30864 707/706 |
| 2004/0073539 A1 | 4/2004 | Dettinger et al. | |
| 2004/0193420 A1 * | 9/2004 | Kennewick et al. | ........... 704/257 |
| 2005/0177573 A1 * | 8/2005 | Gauthier et al. | ................. 707/10 |
| 2006/0015483 A1 * | 1/2006 | Gownder | .......... G06F 17/30427 |
| 2007/0276825 A1 | 11/2007 | Dettinger et al. | |
| 2009/0119254 A1 | 5/2009 | Cross et al. | |

OTHER PUBLICATIONS

Extended European Search Report dated May 3, 2011 from EP09180608.3.
Kennedy, Niall, "Sniff browser history for improved user experience", 2009, 11 pgs. (http://www.niallkennedy.com/blog/2008/02/browser-history-sniff.html).
iLoveTheCode.com, "Select All or Highlight Text Fields and Textareas Using Javascript", Jan. 10, 2009, 4 pgs. (http://ilovethecode.com/Javascript/Javascript-Tutorials-How_To-Easy/Select_All_or_Highlight_Text_Fields_and_Textareas_Using_Javascript.shtml).
eBay Desktop program, Dec. 22, 2009, 1 pg.

(Continued)

*Primary Examiner* — Robert Beausoliel, Jr.
*Assistant Examiner* — Nirav K Khakhar
(74) *Attorney, Agent, or Firm* — Fish & Richardson P.C.

(57) ABSTRACT

A device and method for reusing user-specified content is provided. After generation of a query comprising parameters explicitly set by the user, the explicitly set parameters are stored in a parameter store. If a subsequent query is generated without any explicitly set parameters, the stored parameters are automatically applied to the subsequent query, and the modified query is then transmitted to an online service, such as an e-commerce site or search engine. User query preference history may be stored for use in modifying a subsequent theory. In addition, the user may navigate to specially designated content on a page, and when the content is in focus, the user may optionally copy the content for reuse in generating a further query or for publication.

21 Claims, 11 Drawing Sheets

(56) References Cited

OTHER PUBLICATIONS eBay Inc., "eBay mobile iPhone app Search Feature Request", Nov. 2, 2009, 2 pgs. (http://forums.ebay.com/db1/topic/Ebay-Mobile/Ebay-Moblie-Iphone/510150334).

Mozilla, "Form autocomplete", Nov. 13, 2009, 4 pgs. (http://support.mozilla.com/ca/kb/form+autocomplete).

Mozilla, Add-ons for Firefox, "Content Preferences 0.4.1", Aug. 22, 2008, 5 pgs. (https://addons.mozilla.org/en-US/firefox/addon/4066).

Ixquick, "Privacy", 2009, 5 pgs. (http://www.ixquick.com/eng/protect-privacy-qa.html#q10).

Ixquick, "My Settings", 2009, 2 pgs. (http://us2.ixquick.com/do/preferences.pl?language_ui=english).

Google, "Preferences", 2010, 2 pgs. (http://www.google.ca/preferences?hl=en).

eBay Inc., "Searching—new features and a new look", 1995-2009, 2 pgs. (http://pages.ebay.co.uk/newlook08/newsearch/index.html).

Taylor, Randy L., "Javascript—Copy a whole DOM node (browser independent)", Mar. 11, 2004, 4 pgs. (http://en.allexperts.com/q/Javascript-1520/Copy-whole-DOM-node.htm).

Internet.com, "The JavaScript Source: Page Details: Copy Selected Text", 2010, 4 pgs. (http://javascript.internet.com/page-details/copy-selected-text.html).

Snipplr, "copy selected text", JavaScript, Mar. 23, 2007, 4 pgs. (http://snipplr.com/view/2383/copy-selected-text/).

Examination Report mailed Sep. 23, 2013, in corresponding EP patent application No. 09180608.3.

* cited by examiner

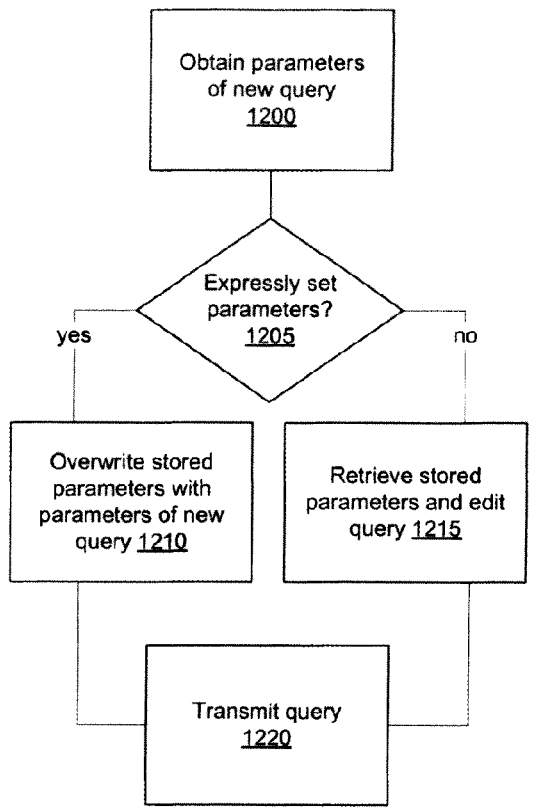
FIG. 12A
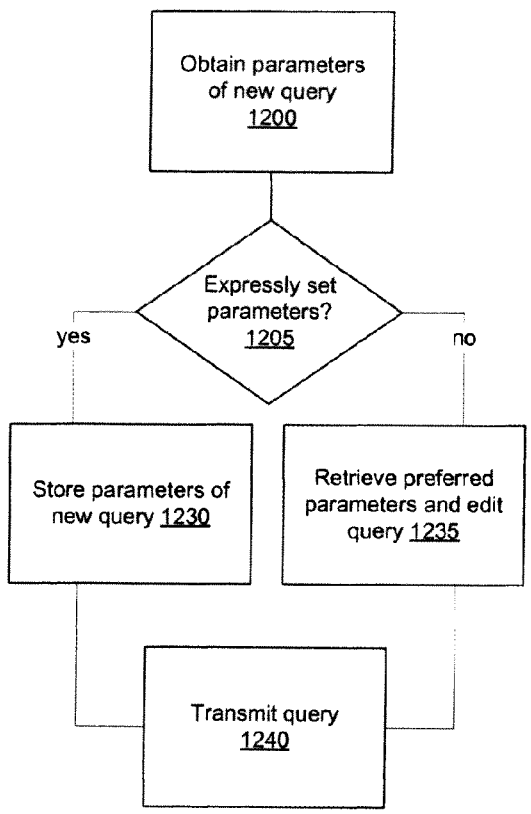
FIG. 12B
FIG. 13A
FIG. 13B

1410a convertible+car

| priceorder | 1 |
|---|---|
| distance | 1 |
| topsellers | 0 |
|  |  |
|  |  |

1430a

1410b cardigan

| priceorder | 1 |
|---|---|
| topsellers | 1 |
|  |  |
|  |  |
|  |  |

|  | 1512 shopsite.com | 1514 | 1516 e-bidder.com |
|---|---|---|---|
| price_order | priceorder |  | askPriceOrder |
| free_ship | freeship |  | freeship |
| top_sellers | topseller |  |  |
| ... | ... |  | ... |

| price_order | 1 |
|---|---|
| top_sellers | 1 |
| ... | ... |

| price_order | 1 | 1 | 0 |
|---|---|---|---|
| top_sellers | 1 | 0 | 1 |
| ... | ... | ... | ... |

FIG. 15C

AUTOMATIC REUSE OF USER-SPECIFIED CONTENT IN QUERIES

CROSS REFERENCE TO RELATED APPLICATIONS

The present application claims benefit of U.S. Provisional Application 61/262,332, filed Nov. 18, 2009, which application is fully incorporated by reference herein.

TECHNICAL FIELD

The present invention relates generally to storing user preferences or other user-specified information, and more specifically to storing user preferences and user-designated data for reuse in communication with an online service.

DESCRIPTION OF THE RELATED ART

Users may interact with an online or network service, such as a search engine or e-commerce site, using a client application executed on a client device such as a personal computer or mobile communication device. In these interactions, users often engage in search queries for which preferences in the form of parameters or filters can be specified. For example, in searching for products on an e-commerce site, the user can specify that search results be returned and displayed by the client application in order of ascending price, or choose to view only those products for which free shipping is available. Regardless when such sort orders or filters are applied by the user, this requires at least one extra step on the user's part to define the preferences to be applied. In the circumstance where the client application does not sort search results itself, but rather receives the search results from the online service, if the user only remembers to apply preferences after the search results are initially returned, a further request must be transmitted to, and a further response received from, the online service in order to obtain the sorted, filtered results.

Also, when reviewing content presented by a client application, some of the information comprised in the content may be of particular interest to the user for later re-use. For example, information about an item returned in a query result may be accompanied by a unique identifier value, or may be accompanied by a descriptor that the user may wish to record for later use in a further query or other activity. This may require the user to make a written note of the information of interest, then key in the information in the appropriate input area of the client application when it is to be reused. This is a cumbersome procedure, and is particularly inconvenient when the information is a string of alphanumeric characters without any inherent meaning or pattern for the user. The user could make a note of the information of interest using the client device by scrolling to the portion of the content containing the information if necessary, selecting the information using a user interface device such as a trackball, touchpad, touchscreen, and the like, and then invoking a copy command to store a copy of the information temporarily in memory. The user may then store the information elsewhere, for example in a text file created using a different application on the client device. When the information is to be reused, the information is retrieved from the file using the different application, copied temporarily to memory, and then the client application communicating with the online service is brought into focus or launched so that the copied information may be pasted into an appropriate input area. Again, this is cumbersome because of the multiple steps the user must take to record the information of interest.

BRIEF DESCRIPTION OF THE DRAWINGS

In drawings which illustrate by way of example only embodiments of the present invention.

FIGS. 12A and 12B are flowcharts of methods for modifying queries.

FIGS. 13A and 13B are schematic representations of parameter stores for use with the methods of FIGS. 12A and 12B.

FIG. 14 is a further schematic representation of a parameter store.

FIGS. 15A, 15B, and 15C are schematic representations of stores for use with the methods of FIGS. 12A and 12B in association with multiple online services.

DETAILED DESCRIPTION

The embodiments described herein provide a system and method for storing user preferences or other user-specified information in connection with communication with an online or network service for reuse in later communication with the same or another service. These embodiments will be described in relation to a client device, such as a mobile communication device, having a display for displaying content within a graphical user interface. It will be appreciated by those skilled in the art, however, that this description is not intended to limit the scope of the described embodiments to mobile communication devices. The methods and systems described herein may be applied to any appropriate communication or data processing device capable of communicating over a network, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like.

Figure 1:
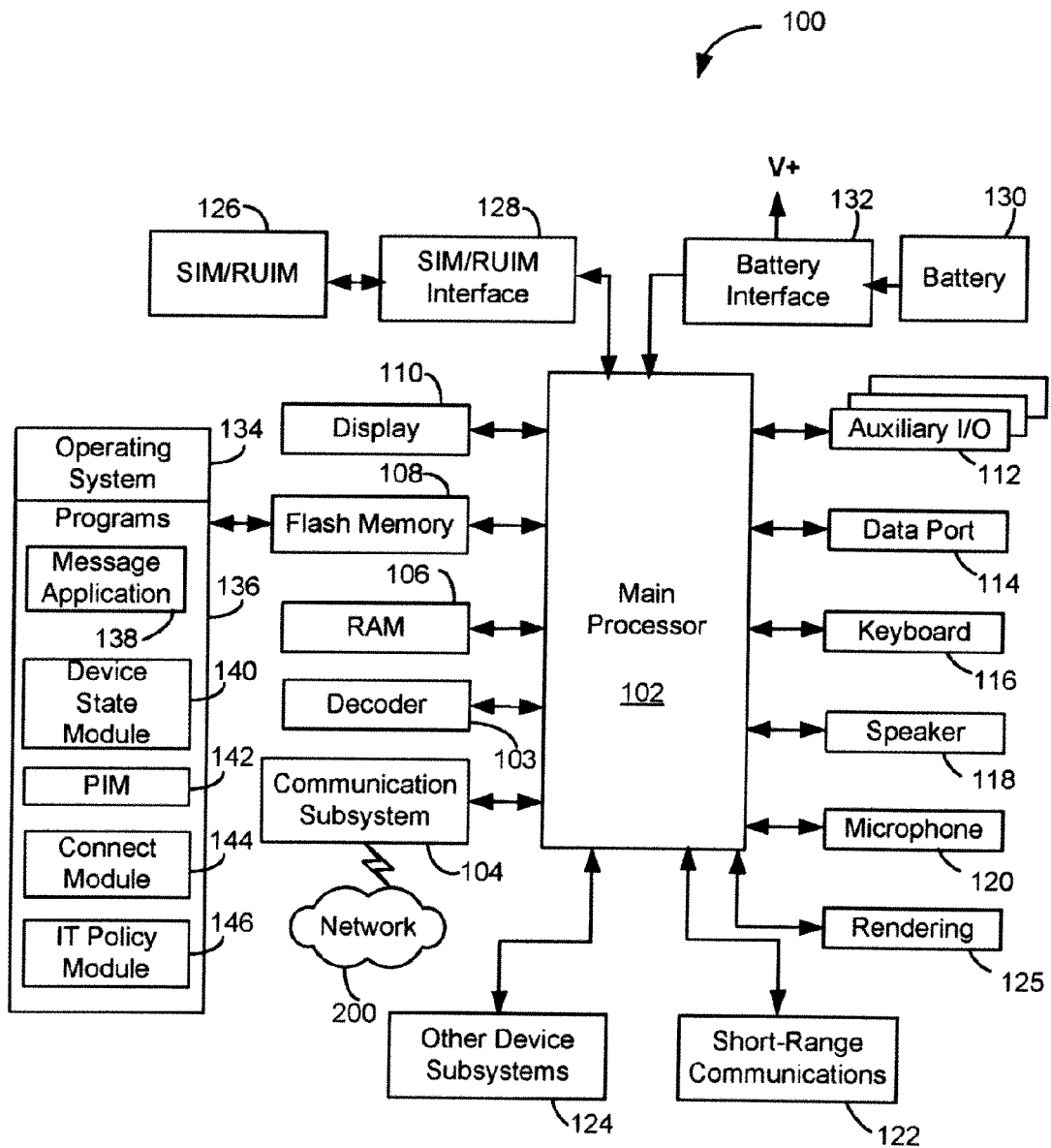
FIG. 1 is a block diagram of an embodiment of a mobile device.
Figure 2:
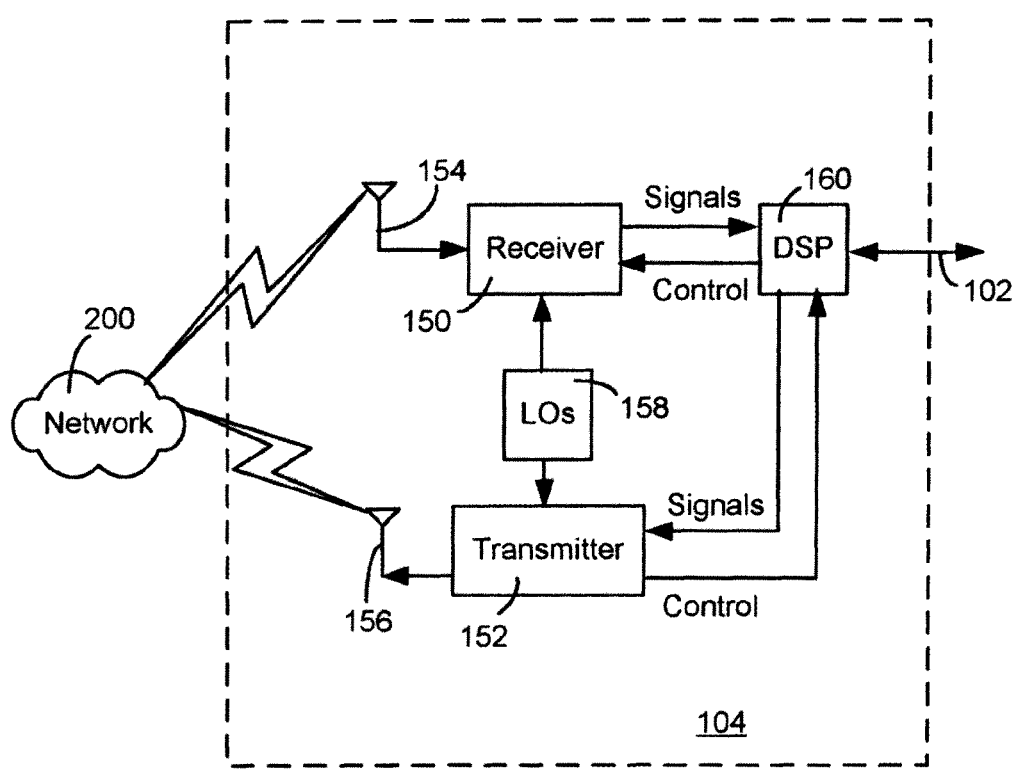
FIG. 2 is a block diagram of an embodiment of a communication subsystem component of the mobile device of FIG. 1.
Figure 3:
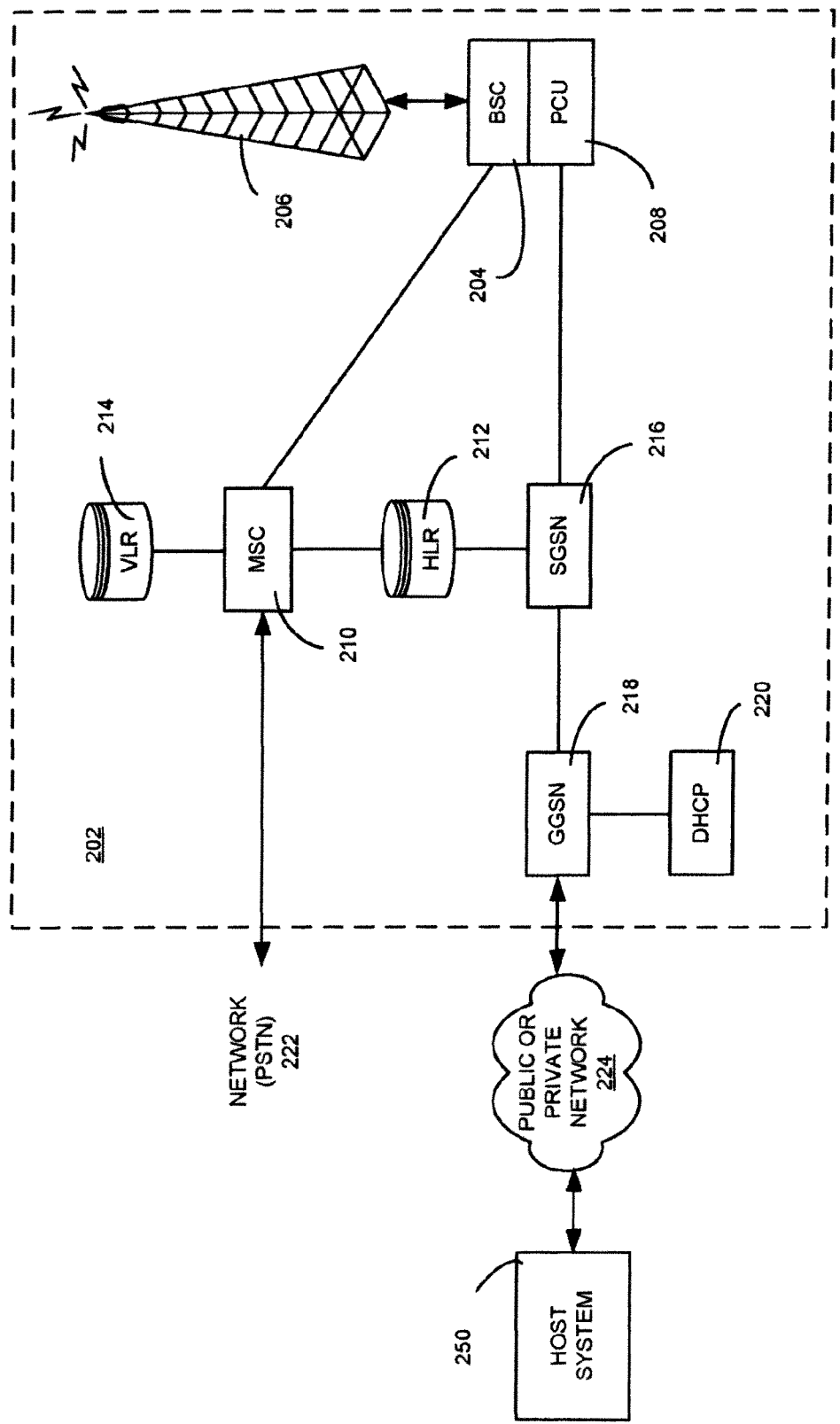
FIG. 3 is an exemplary block diagram of a node of a wireless network for use with the mobile device of FIG. 1.
Figure 4:
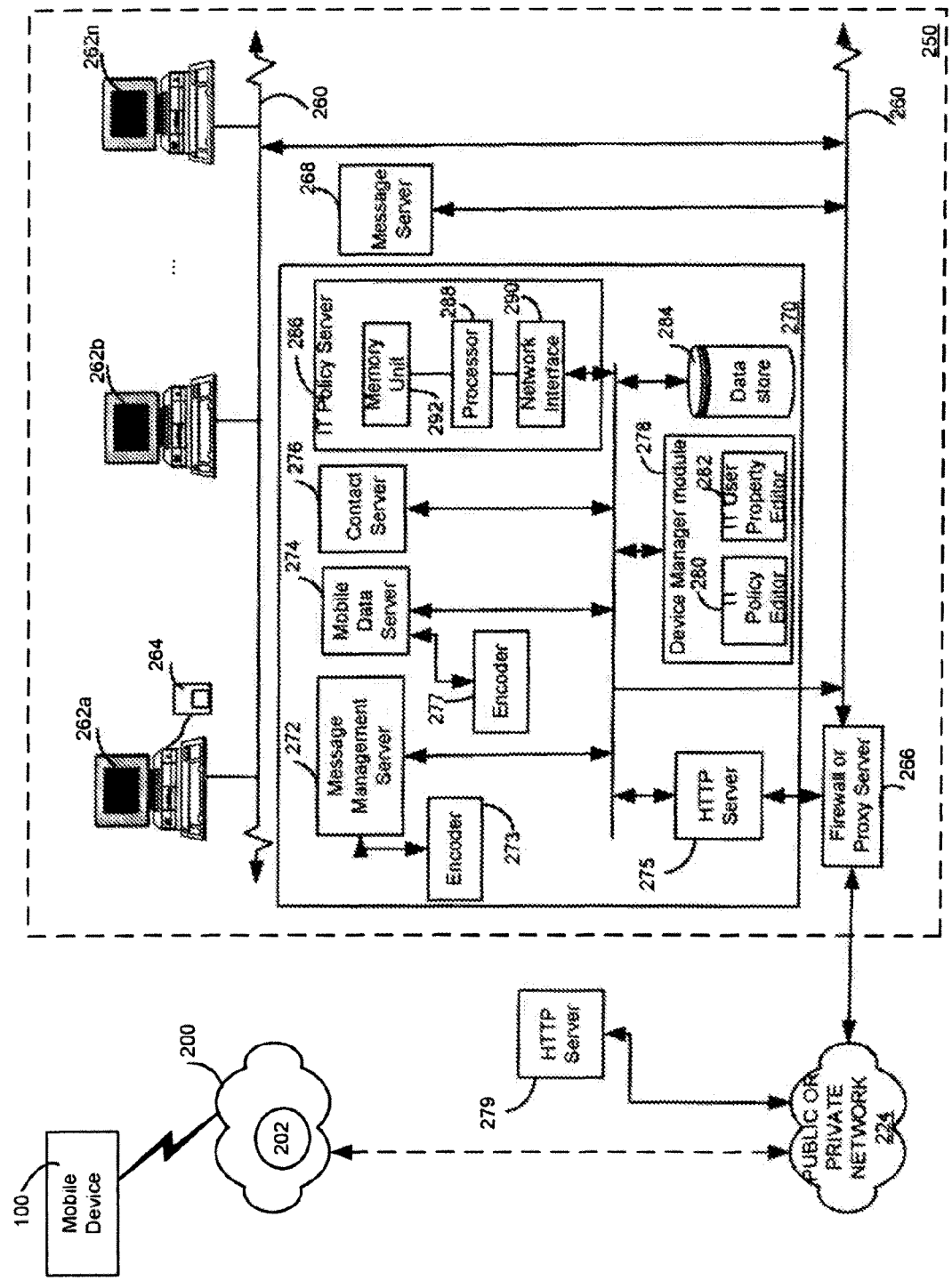
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE and UMTS. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering circuit 125 may be implemented as hardware, software, or as a combination of both hardware and software.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's communication device 100 is situated on a LAN connection. The cradle 264 for the communication device 100 can be coupled to the computer 262a by a serial or a Universal Serial Bus (USB) connection, for example. Other user computers 262b-262n are also situated on the network 260, and each can be equipped with an accompanying cradle 264. The cradle 264 facilitates the loading of information (e.g. PIM data, private symmetric encryption keys to facilitate secure communications) from the user computer 262a to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262a-262n are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262a can request the e-mail messages associated with that user's account stored on the data store associated with the message server 268. These messages are then retrieved from the data store and stored locally on the computer 262a. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

Rendering data files originally optimized or prepared for visualization on large-screen displays on a portable electronic device display often requires additional processing prior to visualization on the small-screen portable electronic device displays. According to an embodiment, this additional processing is accomplished by the rendering engine 125 shown in FIG. 1. As will be appreciated by those of skill in the art, the rendering engine can be implemented in hardware, software, or a combination thereof, and can comprise a dedicated image processor and associated circuitry, or can be implemented within main processor 102.

Figure 5:
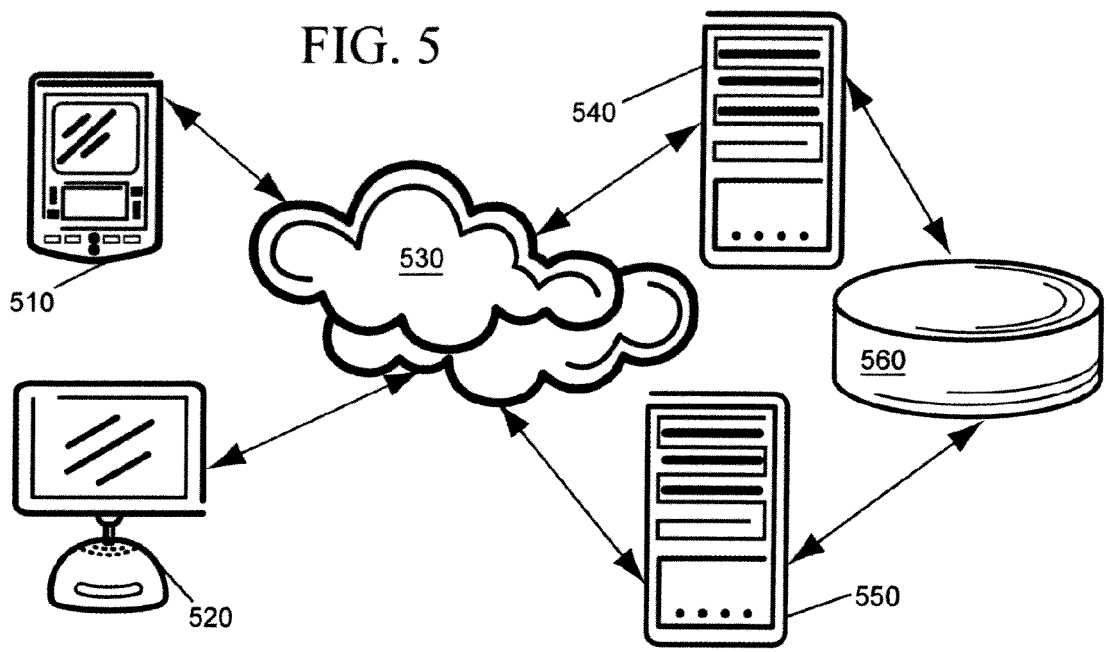
FIG. 5 is a schematic representation of a system incorporating the client device and the online service of the within embodiments.

The embodiments described herein are described in the context of a client device and application in communication with a service over a network. A simple embodiment is shown in FIG. 5. The service 540, 550, 560 may be a web service, such as an e-commerce site, a research or library site, stock quotation or business research site, or any other site that is capable of receiving queries for data that can be modified by filters or parameters, which define the scope of the query or the order in which results are returned in response to the query. The service may include one or more servers 540, 550, for communication with client devices such as mobile communication devices 510 or personal computers 520, or other communication devices, over a network such as the Internet 530. The servers 540, 550 may carry out the same or different tasks, such as handling application program interface calls from client applications, or handling requests received from client web browsing applications. The servers 540, 550 may be in communication with one or more databases 560 storing information for responding to queries.

Typical examples of such services include search engines such as the Google™ search engine service provided by Google Inc., Mountain View, Calif., USA 94043, and available at www.google.com. Search engines may not store the information ultimately of interest to the user that the user wishes to find, but rather comprise one or more databases 560 cataloguing data about information sources, such as bibliographic data. These databases 560 aid in searches of these information sources by providing responses to queries received by the database server, for example over a web interface from a client application operated by the user. The responses may include information about information sources comprising content relevant to a query. Other search engines may provide additional information from the information source, either because the search engine has access to a set of data cached from the information source, or because additional data is retrieved from the information source and presented in responses. Other examples of online services include e-commerce websites such as www.amazon.com, operated by Amazon.com Inc., Seattle, Wash., USA 98108, or www.ebay.com provided by eBay Inc., San Jose, Calif., USA 95125, or other sites for cataloguing, storing, and displaying user-generated content such as pictures, videos, and text. Such online services may include an integrated search function to allow users to search for items or content available from the service. Different types of online services providing responses to queries concerning the contents of databases maintained by those services, and their implementation and use, in particular the provision of responses to queries for database information, will be known to those skilled in the art. The embodiments described herein apply to such other online services that may share similar characteristics as described below.

Figure 6:
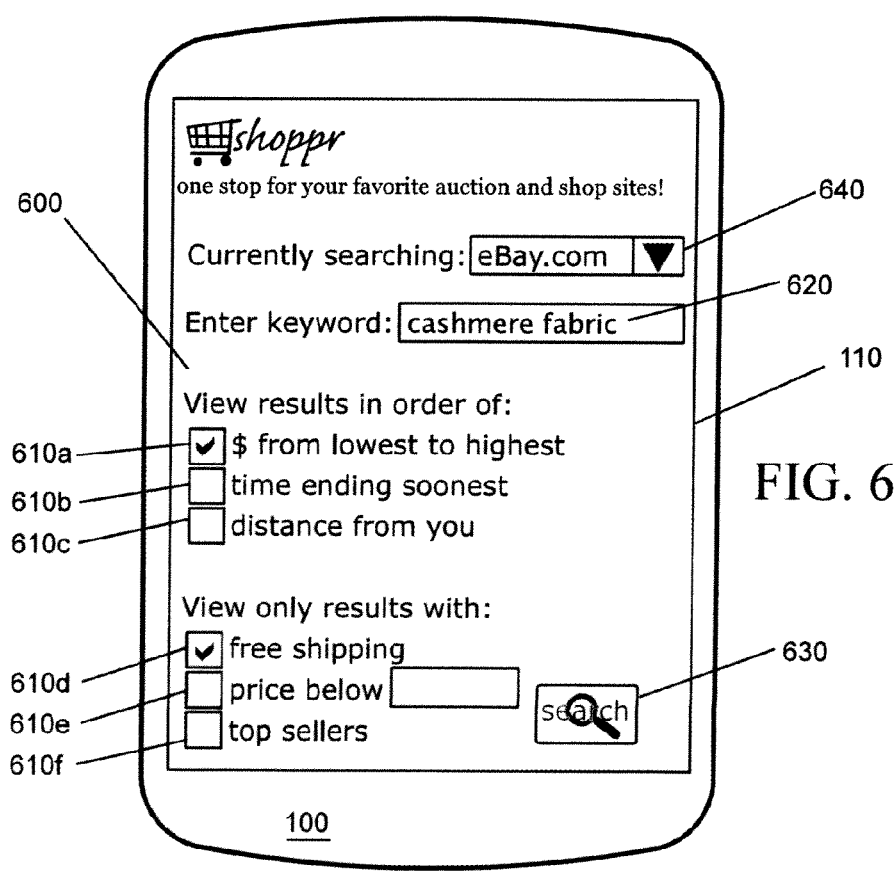
FIG. 6 is an illustration of a search interface on a client device display.

FIG. 6 illustrates a typical page 600 of content, as it may be displayed on a client device 100 executing a client application. The page 600 may include content not presently viewable on the display 110 of the client device 100, which would be made viewable to the user by navigating through the content so as to scroll the content on the display 110. Scrolling content, and the use of user input subsystems 112 such as trackballs, touch pads, touchscreens, scroll wheels, and the like, will be known to those skilled in the art. (User input subsystems 112 are not shown in FIG. 6.)

The content of the page 600 may include a graphical user interface for user selection and input. In the example of FIG. 6, the client application executing on the device 100 is a shopping application, so the page 600 therefore presents the user with a number of options for searching a selected e-commerce site. It will be understood by those skilled in the art that the embodiments described herein, although described in the context of e-commerce, may be applied to client applications and online services associated with other endeavours. The selected e-commerce site is indicated in select box 640, which in this example provides the user with the option of selecting other e-commerce sites. A text input box 620 is provided for user entry of data for a keyword-based search of the selected site. Options 610*a* through 610*f* provide user-selectable parameters for configuring search results returned in response to a query sent to the e-commerce site. In the example of FIG. 6, the options are provided as checkboxes, and options 610*a* and 610*d* are checked. Some parameters may be parameters directed to the order of presentation of query results, such as options 610*a*, 610*b*, and 610*c*, which specify an order of price from lowest to highest, time ending soonest (if items searchable on the site expire), and geographical distance from the user, respectively. Other parameters may operate as filters, excluding query results that do not match the filter conditions. In FIG. 6, options 610*d*, 610*e*, and 610*f* are filter parameters for items having free shipping, a price below a user-specified amount, and items offered by top sellers as identified by the online service. Some parameters, such as 610*e*, may require a further argument entered by the user. Another such parameter could be a filter option specifying that items must be available for pick-up, and must be located within a user-entered geographical distance from the user.

Button 630 may be actuated by the user to initiate a search. When the user initiates a search by actuating the button, or by invoking a command to commence a search, the client application makes use of the parameters selected by the user, such as a keyword or keywords input in the text input box 620, and the selection or non-selection of options 610*a* through 610*f*, to construct a query for the online service identified in the select box 640. It will be understood that additional options not specified in FIG. 6, or fewer options, may be presented to the user by the client application. For example, a client application may be dedicated to communication with a single online service, so the select box 640 need not be provided. The client application may be a web browser or a similar application that renders and displays webpage data received from an online service, and so the webpage may present the user with options defined by the online service in the webpage data.

The general construction of the query for the online service, and the methods of transmitting the query from a client application, receiving the query at the online service, responding to the query, receiving the response at the client application and displaying the response to the user will be understood by those skilled in the art. For example, with specific reference to the query, the query may take the form of a Hypertext Transfer Protocol (HTTP) GET or POST submission from the client application to the online service, if the online service is configured to communicate using HTTP. Thus, the query may be constructed to include a resource identified with a uniform resource indicator (URI) together with a series of name-value pairs, in which each name-value pair defines a parameter defined by the user. A simple example of a portion of a query that may be submitted using GET to the online service is shown below:
GET /items.html?keyword=cashmere+fabric&priceorder=1&freeship=1&perpage=15

The query may include other content for communicating with the online service. As would be well understood by those skilled in the art, the user parameters selected in the page 600 may be used to construct the argument of the request, where "keyword=cashmere+fabric" is the name-value pair consisting of the name "keyword" and the value "cashmere+fabric", which is a URL encoded version of the data input by the user in the text input box 520. Other name-value pairs may correspond to other options explicitly selected by the user, such as "priceorder=1", which may correspond to the user's selection of option 510*a* where the value "1" corresponds to ordering results from lowest to highest price; and "freeship=1", which may correspond to the user's selection of filter parameter 610*d*, where the value "1" indicates the filter is to be applied. Other name-value pairs may correspond to other options that are set by default by the client application, such as "perpage=15", which may correspond to an instruction to the online service to deliver a response in which only fifteen items identified in response to the query are shown in a single page. The structure of the query need not utilize name-value pairs, but those user-selected or input parameters that define the scope or order of query results may be passed to the online service in another format.

Some parameters that are set to default values may be expressly or implicitly conveyed to the online service. In the example above, the "perpage=15" option was not selected by the user in the example of FIG. 6; it may be a default setting that is normally applied by the client application, and that may be configurable by the user using a configuration view in the client application. The "perpage=15" option, in this example, is expressly included in the query. However, parameters that are set at default values may not need to be transmitted to the online service in the query. For example, by default, the online service may return query results in the order in which they were added to the service's database, or by decreasing relevance to the keyword terms submitted in the query. If the user does not wish to have the query results reordered from this default ordering, there is no need to include a parameter specifying these preferences included in the query, unless the parameter is required to be included by the online service. Thus, if the default query result order is in order of decreasing relevance, the following query strings may have the same effect on the order of query results returned by the online service:

GET /items.html?keyword=cashmere+fabric&priceorder=1&freeship=1&perpage=15&relevance=0
GET /items.html?keyword=cashmere+fabric&priceorder=1&freeship=1&perpage=15 where "relevance" is a parameter denoting a query result sort order, which defaults (with the associated parameter value "0") to an order of decreasing relevance.

Figures 7, 8:
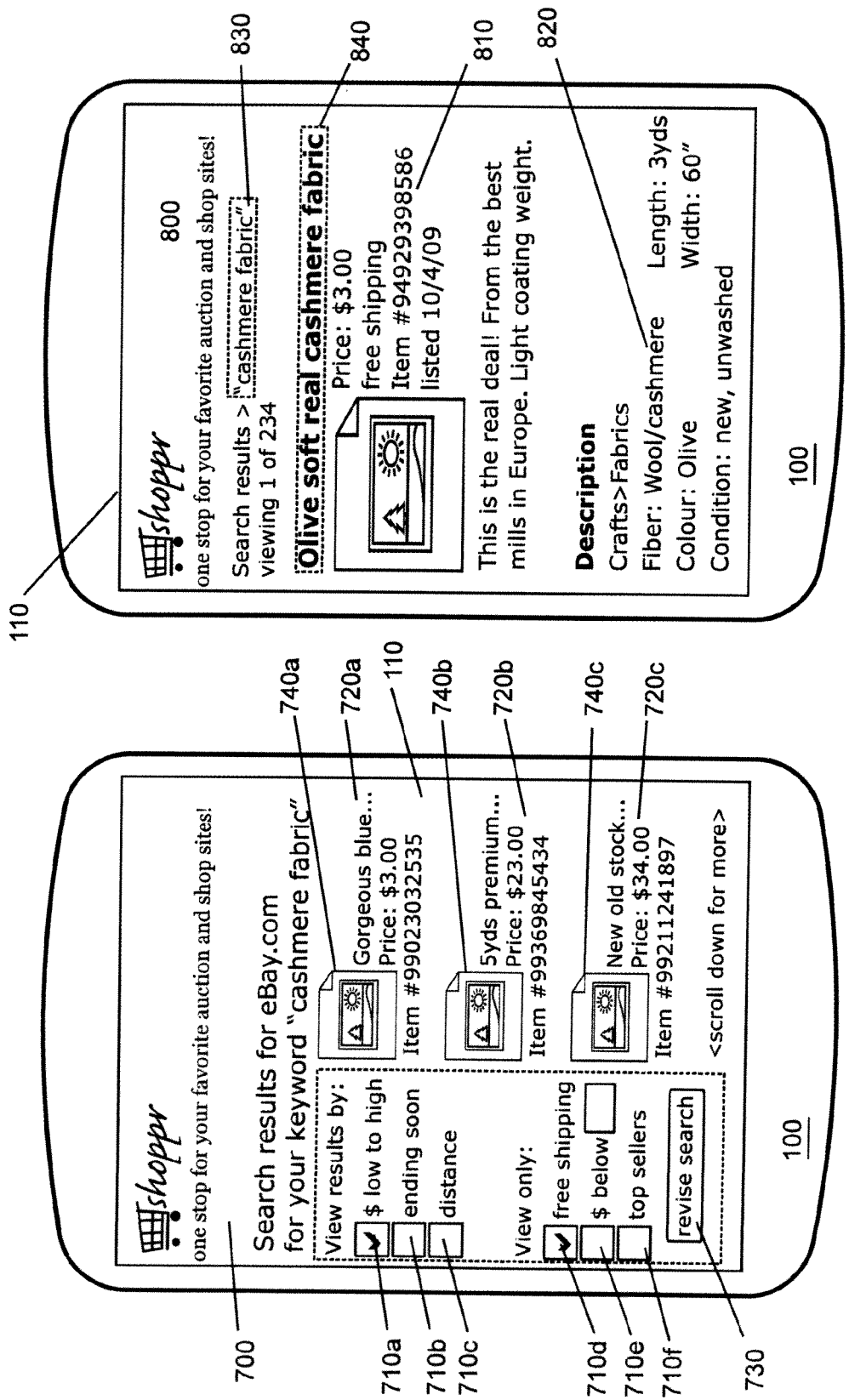
FIG. 7 is a further illustration of a search interface and query results on a client device display.
FIG. 8 is another illustration of a page comprising item information on a client device display.

In the example of FIG. 6, the user may input query parameters before initiating the search. The client application and/or online service may also provide the user with the option to input query parameters after the query results have been delivered to the client application and displayed to the user. Turning to FIG. 7, a further page 700 displayable on the display 110 of a device 100 is shown. This page displays results that may be returned by the online service in response to a query. Query results 720*a*, 720*b*, 720*c* are shown, each including an optional photograph or other graphic 740*a*, 740*b*, 740*c* respectively. Also displayed on the page 700 are parameters that the user may select to revise the query results presented by the client application, either by specifying a query result sort order by selecting 710*a* (listing results in order of lowest to highest price), 710*b* (in order of when the item's listing will end), or 710*c* (in order of geographical distance from the user). In addition, parameters for filtering the query results are also provided at 710*d*, 710*e*, and 710*f*, similar to those described above with respect to FIG. 6. As above, other parameters that may be applied to alter or filter query results will be known to those skilled in the art. If the user at this point chooses to alter the parameters, then a revised query reflecting the changed parameters may be transmitted by the client application to the online service. The online service may then execute the revised query, and return the query results in accordance with the changed parameters.

The user may have preferences concerning the parameters governing query result ordering or filtering, and may apply these preferences each time a search or other query is initiated using the graphical user interface illustrated in FIG. 6. However, the user may occasionally forget to apply those parameters, requiring the user to have to take the extra step of applying the parameters after the query results have been returned as in FIG. 7. While the client application may provide a configuration view (not shown) in which the user may explicitly select parameters to be applied to all queries, this also requires the user to take an extra step, and moreover if the user wishes to change those parameters, he or she must return to the configuration view to make changes. Accordingly, the client application may provide a method and system for automatically applying parameters.

With reference to FIG. 12A, when the client application determines that the user wishes to execute a search or other query through the user's action in clicking the button 630 or in invoking a query command by other means, the client application obtains the parameters of the new query at block 1200 to prepare the query for transmission to the online service. The client then determines at 1205 whether any of the parameters in the query were explicitly set by the user, for example by the user expressly selecting options such as 610*a* through 610*f* in FIG. 6. If there are expressly set parameters, then the client stores these parameters at block 1210. If there were previously stored parameters, the client may overwrite the existing stored parameters with the parameters of this new query. The storage of the parameters is discussed below. The client then proceeds to transmit the query to the online service at 1220. If there are no explicitly set parameters, while it is possible that the user may have elected to proceed with a query using only default parameters, it is also possible that the user may have inadvertently skipped the step of applying the parameters he or she wished to apply. Therefore, at 1215 the client retrieves stored parameters, if any are available, and applies them to the query. The query is thus modified from its original state when the user invoked the search command. The query is then transmitted to the online service at 1220. Thus, the query results that are returned in response to the query that is transmitted by the client will include the stored parameters that were applied by the client after receipt of the command from the user, but before transmission of the query to the online service. When the query results are presented to the user, for example in the format depicted in FIG. 7, any options 710*a* through 710*f* presented to the user on the page 700 may be set to reflect the parameters as modified by the client.

The stored parameters may be stored in persistent memory on the client device 100 accessible by the client application, so that the parameters may be retrieved and applied in subsequent sessions, for example even after the client device 100 is rebooted or after power loss. Examples of parameters stored in memory for use in the process of FIG. 12A are shown in FIG. 13A in a tabular format. It will be understood by those skilled in the art that the parameters may be stored in any suitable format, and that the tabular format is used for ease of reference. For example, the parameter stores described below may be implemented in a hash table stored in the memory of the client device 100. The parameters are stored in associated name and value pairs in a parameter store 1300. Thus, if the user had expressly selected parameters 610*a* and 610*d* of FIG. 6, i.e., a query result sort order from lowest to highest price and a filter for free shipping items only, these parameters would be stored at step 1210 of FIG. 12A. Each of the explicitly set parameter names and its associated value would be stored. Thus, in FIG. 13A, column 1310 stores the parameter names "priceorder" and "freeship", and column 1315 stores the corresponding values of "1" and "1", which in this example denotes that the ordering parameter or filter is to be applied. If the parameter requires an argument, such as a dollar value, then this argument may be stored in the store 1300. Thus, the parameter store 1300 may only contain as many parameter records as there are parameters in the most recently used query, and the parameter store 1300 is updated after every query including an explicitly set parameter. If a subsequent query included only one explicitly set parameter, then following the process of FIG. 12A, the entire content of the parameter store 1300 would be replaced with a single record reflecting the one parameter and associated value in the subsequent query.

If FIG. 13A reflects the state of the parameter store 1300 at the time a query is initiated by the user at block 1200 of FIG. 12A, and it is determined at block 1205 that no explicitly set parameters were included in the query, at 1215 the client application would then retrieve the stored parameters from the parameter store 1300, and apply them to the query.

There may be a number of optional parameters available to be set by the user, and as noted above, some parameters may be explicitly set to take on their default values, and would therefore be included in a query in accordance with the method set out in FIG. 12A. In a further embodiment, to reduce the size of the parameter store, only those parameters that are expressly set with non-default values are stored in the parameter store 1300. The client may determine whether a given parameter is set to a non-default value by evaluating the value associated with the parameter (for example, as a rule all default values may be "0"), or by comparing the parameter values with a stored set of default values for all parameters.

In the above embodiment, the parameter store 1300 is updated each time a query is constructed with expressly set parameters, and no user history with respect to query parameters is stored. In a further embodiment, user history is aggregated in the parameter store for use in predicting the likeliest parameters to be applied. Turning to FIG. 12B, a new query is received again at 1200 as a result of a user command, and again it is determined at 1205 whether the query comprises explicitly set parameters. If the query does include explicitly set parameters, then at 1230 the explicitly set parameters are stored in the parameter store 1350, illustrated in FIG. 13B. Unlike the process of FIG. 12A, however, the previously stored parameters in the parameter store are not necessarily overwritten. Rather, parameters from the most recent n queries may be stored in the parameter store 1350. In the example of FIG. 13A, parameters from the three most recent queries are stored, and their values are reflected in columns 1360, 1365, and 1370. If there is a size limit on the parameter store 1350 and it is currently at its capacity, the parameters from the oldest query stored in the parameter store 1350 may be removed and the parameters from the most recent query inserted.

If it is determined at 1205 that there are no explicitly set parameters in the query, then at 1235 the client retrieves a preferred set of parameters from the parameter store 1350 and applies them to the query to produce a modified query. The preferred set of parameters may be determined from the parameter store 1350 by determining the values most frequently used for each parameter identified in column 1355. For example, the parameter "priceorder" was set to value "1" twice, and to "0" once. The "0" entry may reflect either a query in which the "priceorder" parameter was expressly set to "0", or a query in which this parameter was not selected by the user, but was effectively treated as an express setting when the query parameters were stored in the parameter store 1350 because the user had expressly set other parameter values. Since the value "1" had been used more frequently for "priceorder" than the value "0", the client application will determine that "1" is the preferred value for the "priceorder" parameter, and will apply the parameter-value set "priceorder=1" to the query. Similarly, it can be seen that the parameter "timeending" was set to "0" (i.e., left at its default setting) more frequently than not, and so it will either be omitted from the modified query since it is a default value, or will be expressly applied as "timeending=0". If it cannot be determined which parameter value for a given parameter was the most frequently used, for example because different values were used equally frequently, then the client application may select the most recently stored value for that parameter to apply to the query. Different algorithms for determining which value of a number of historic values to be applied to a given parameter may be applied by the client application.

Thus, in this second embodiment, the preferred set of parameters may change over time as the user continues to create and initiate queries with expressly set parameter values. If the user does not expressly set any parameter values for a subsequent query, the client application will automatically apply a set of automatically-determined preferred parameter values to the query. The user may therefore rely on the client application to "remember" preferred query parameter values, without being required to take explicit steps to instruct the client application to remember those preferred values. By automatically editing a query to apply parameter values in this manner, the client application saves the user a step of applying parameter values after the query results are received by the client application, as in FIG. 7.

The user may wish to clear or override the automatic modification of queries. The client application may provide the user with an explicit option to do so, for example in a configuration view of the client application, to clear the parameter store 1300 or 1350. Alternatively, the client application may "learn" when the user wishes to clear the parameter store based on user behaviour. The client application may maintain a count of the number of consecutive queries initiated by the user with no expressly set parameter values. If the count exceeds a predetermined amount, then the client application may query the user whether the user wishes to clear the parameter store, or may automatically clear the parameter store without first querying the user. For example, if the parameter store contains stored parameter values, and the user initiates ten searches without expressly setting any parameters besides keyword search terms, the client application may determine that the user does not wish to continue using the stored parameter values, and will clear the parameter store. In a further alternative, the client application may carry out a variant of the process illustrated in FIG. 13C, and may store a set of parameter vales for every query initiated by the user, even if there are no expressly set parameters. Thus, the client application would store default values for every parameter for which no alternative value is expressly set. After a number of such "default" queries, the client application will determine from the parameter store 1350 that the preferred parameter values are the default values, because the default values will be the most frequently used according to the parameter store 1350.

It is possible that a user may wish to use different parameter values for different types of keyword searches. For example, the user may periodically conduct searches for both automobiles and clothing. The user may be willing to purchase clothing from geographically remote vendors, but prefers to find automobiles for sale locally. Thus, when searching an e-commerce site for "convertible+car", the user may specify a parameter value in which query results are sorted so that the closest vendors are listed first, but when searching for "cardigan", leaves that parameter value in its default state and instead filters the query results for "top sellers" only. Therefore, in a further embodiment, the client application stores expressly set parameters in a parameter store, but in association with the keywords entered by the user. An example of such a parameter store 1400 is shown in FIG. 14. For each set of keywords 1410*a*, 1410*b* used by the user in queries, a separate set of parameters 1420*a*, 1420*b* and associated values 1430*a*, 1430*b* is stored in association with the corresponding keywords 1410*a*, 1410*b*, in the same manner described above with respect to FIG. 13A. If the user then initiates a subsequent query using one of these keyword sets 1410*a*, 1410*b* without expressly setting any parameter values, the client application retrieves the appropriate set of parameter values for that keyword set from the parameter store 1400 and applies it to the query to produce a modified query, which is then transmitted to the online service. Similarly, each set of associated parameters and values for each keyword set may include historical data, as described above with reference to FIG. 13B, and the client application may carry out the process described with reference to FIG. 12B for a given keyword set. The number of keyword sets and associated parameters and values may be limited; for example, the parameter store 1400 may only store data for the last five or ten keyword sets used by the user.

In a further variant, the parameter store 1400 may store associated parameters and values for each separate keyword within a keyword set; thus, rather than storing parameters and values in association with "convertible+car", the parameter store 1400 may store one set of parameters and values in association with "convertible", and another set of parameters and values in association with "car". If the user then initiates a subsequent search using only the word "car", the client application may still refer to the parameter store 1400 to retrieve previously stored parameters to apply to the query. In the event that the user combines two keywords in a subsequent search, the client application may apply a weighting algorithm to determine which value should be applied to a parameter.

In the foregoing embodiments, it is presumed that parameters pertaining to query result search order and to filters would be stored in the parameter store. The above embodiments may be varied so that only those parameters pertaining to query result search order are stored in the parameter store, and filter parameters are not, or vice versa.

As described with respect to FIG. 6, the client application may be configured to transmit queries and receive responses from a number of different online services, or it may be configured to communicate with only one service. If the client application is configured to communicate with multiple online services, each service may specify a different format for its queries; the different services may use different parameter names or value formats, and some services may accept parameters that other services do not. Thus, separate parameter stores 1300, 1350, 1400, or sections of a single parameter store, may be maintained for each service so that each set of parameters and values for use in queries with each service are distinguishable; but in another embodiment, a single repository combining parameters and associated values for all of the online services may be used.

Referring to FIG. 15A, the client application may maintain a first store 1510 in which parameter labels or names for each online service are stored in association with generic identifiers. The generic identifiers in this example are listed in column 1512. For each generic identifier, a corresponding parameter label or name is stored for each online service in a corresponding set 1514, 1516, if such a parameter is indeed available for that online service. For example, it can be seen in column 1516 that there is no corresponding parameter for "top_sellers" for the service "e-bidder.com". The parameter store 1520, shown in FIG. 15B, stores the most recently used parameter value in association with the generic parameter name. If the user initiates a query for "shopsite.com" including expressly set values for the parameters labelled "priceorder" and "topseller", which are indicated in FIG. 15A to be valid parameters for that online service, in accordance with a method such as that described with reference to FIG. 12A the client application would then store those expressly-set parameter values in the parameter store 1520. If, subsequently, the user initiates a query without expressly setting any parameter values for the other service "e-bidder.com", in accordance with the method of FIG. 12A the client application would then retrieve the parameters stored in the parameter store 1520, and would then apply those parameters and values that were legal for queries to the "e-bidder.com" service, using the appropriate names or labels stored in the store 1510. Since the store 1510 indicates that "top_sellers" is not a legal parameter for this service, that parameter would not be included in the query. It will be appreciated that this method for storing all parameters and values for multiple online services may also be carried out in accordance with the method described in FIG. 12B, with a parameter store 1530 with content similar to that shown in FIG. 15C, in which each value is stored in association with the generic descriptor for that parameter, rather than in association with a specific parameter label for a given service.

Parameters and associated values, with or without associated keywords, may also be stored for multiple users within the parameter store 1300, 1350, 1400, 1520, or 1530. The parameter store would therefore store information as described in the various embodiments above, further in association with user credential information, such as a username or other identifying information. If a first user had initiated queries with explicitly set parameters while previously logged in at the client device 100, then the parameter values may be stored in the parameter store 1300, 1350, 1400, 1520, or 1530 in association with the first user's information. If the first user then subsequently initiates a query while logged in at the client device, the appropriate parameter values may then be retrieved from the parameter store for that user. If a second user then logs in at the client device 100 using different credentials and initiates a query, the first user's parameter values will not be retrieved from the parameter store; instead, a separate set of parameter values will be stored and retrieved at the parameter store for that second user, in accordance with the embodiments described above. If the client device 100 permits use of the client application without first requiring a user to log in, then the parameter store 1300, 1350, 1400, 1520, or 1530 may not store any previously explicitly set parameter values for the uncredentialed user for use in subsequent queries; or, alternatively, the client application may maintain parameter values in the parameter store associated with uncredentialed users, which would be retrieved for subsequent queries.

In an implementation in which the parameter store maintains values for multiple users, limitations on available storage space at the device 100 may require that limitations be imposed on the number of search keywords or other data maintained in the parameter store for each user. For example, the parameter store may be configured to store parameter values for up to only three or five search keywords for each distinct user, or may only be configured to store the most recently used parameter values, rather than a more complete history of previously used parameter values. In a further embodiment, the parameter store may be configured to record a parameter value for only the single most frequently used parameter by that user. Alternatively, the application may be configured to determine whether a given parameter was expressly set more frequently than not in the past n queries in a session, for example the most recent three queries. If the parameter was expressly set more often than not in the past n queries, then that parameter value may be stored in the parameter store in persistent memory. Priority may be given to use of the most frequently selected parameter value in modifying queries. For example, if there is sufficient data in the parameter store to calculate the most frequently selected parameter values based on usage history, then the most frequently selected parameter values will be always be used. However, if there is insufficient data stored in the parameter store to determine the most frequently selected preference, which may occur when there has not been enough usage of queries at the communication device 100 to cause sufficient parameter value data to be stored in the parameter store, then the most recent parameter values stored in the parameter store may be used.

The foregoing embodiments have been described in the context of a query initiated by the user prior to receipt of query results for that query. The same processes may be applied after the query results are received and presented to the user as in FIG. 7, if the user then selects or changes selected options 710a through 710f presented on the page 700 to request a further query of the online service.

The query results that are returned by the online service to the client application in response to the query may be provided in any suitable format for communicating data to the client application. The content provided in the results may be formatted or tagged in a manner that allows the client application to parse the content and present it to the user in a useful and meaningful manner. For example, the content may be provided with tags in an extensible markup language (XML) format, so that different attributes or behaviour may be associated with different pieces of content depending on their tags. The use and application of XML will be known to those skilled in the art. The content may be provided in other formats for data interchange, including Simple Object Access Protocol (SOAP) or JavaScript Object Notation (JSON). The selection, use and application of such formats and others will also be known to those skilled in the art.

Referring to FIG. 8, an example of an item description that may have been identified in a query result is shown, as it might be displayed by the device 100. The item description includes several pieces of content, including search keyword information 830, a title 840, an item number 810, and a descriptive term 820. Some of these pieces may be marked up in accordance with an XML schema, if the content is provided in XML format, and accordingly rendered by the client application in accordance with that schema. For example, the keyword information 830 may have been tagged with information associating the information 830 with a hyperlink which, when actuated by the user, would load a page of query results based on that keyword information 830. (That page of query results may result from a query modified and transmitted in accordance with the embodiments described above.) The title 840 may have been marked up with a tag "<title>", so that the client application could apply formatting to the title 840 in accordance with a predefined style sheet.

However, even if the content is marked up and the content processed by the client application accordingly, the ability of the user to deal with particular content elements as he or she wishes is limited by the typical functionality of the client device or operating system. For example, the user may wish to retain a copy of the item number 810 for later use such as searching for the item again or for further refining an existing query. While the user may use an input subsystem 112 such as a trackball, touchpad, and so on, to select the particular content of interest and then copy it, the additional steps involved in selecting and copying the text, and then storing it in a file where it can be located later, detracts from the user's experience. Also, once the content is stored in this separate file, it is disassociated with the client application unless the user took the time to make a note about the provenance of the content; upon returning to the file later, the user may have forgotten its relevance.

Therefore, the client application also renders data so that it may be automatically copied for reuse by the user at a later time. One means by which this may be accomplished is by associating additional attributes to the particular content of interest that are not shared by other content on the page 800. This association may be carried out at the server of the online service and the additional attribute information transmitted to the client application in response to a query, or at the client device 100 after receipt of the content by the client application. If carried out by the client application after receipt, the client application may identify the content of interest using markup or another identifier identifying the content. For example, in an XML implementation, the client application may be configured to assign an additional attribute to content tagged with "<title>", so in the example of FIG. 8 the title 840 will be associated with this additional attribute.

The client application may be configured to prevent copying of any content presented to the user on the display 110, save for content associated with the additional attribute. Thus, when the user invokes a "copy" command while the page 800 is displayed, only the content having the additional attribute is copied to the temporary memory (i.e., the "clipboard") of the device 100. This may be achieved by programming the client device 100 to override any default operating system "copy" or "cut" functionality normally available to client applications. For example, the operating system of the device 100 may be configured to provide functionality available to client applications to provide "copy" operations for focusable content items displayed on the device 100, and "cut" operations for editable content items displayed on the device 100. These "copy" and "cut" operations may be made accessible to a user of the device 100 by a client application executing on the device. These operations may be rendered inaccessible to the user by the client application. Thus, the user need not carry out the extra steps of expressly selecting the content of interest prior to invoking the "copy" command.

Figures 9, 10:
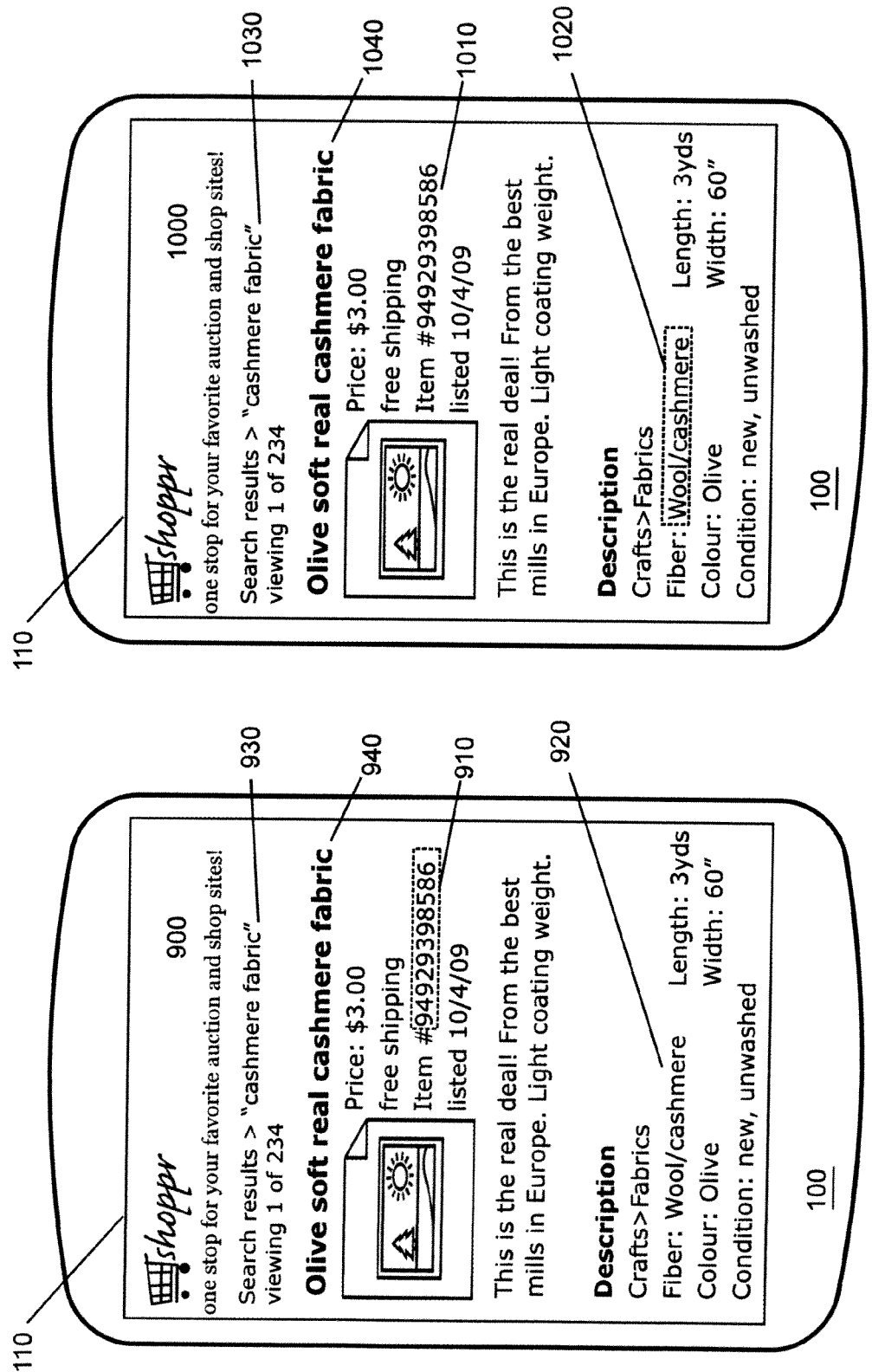
FIG. 9 is a further illustration of a page comprising item information on a client device display.
FIG. 10 is yet another illustration of a page comprising item information on a client device display.

Alternatively, the content of interest may be tagged and associated with additional attributes so that it is capable of gaining focus when the user invokes navigation commands, for example by simply moving a trackball, depressing a tab or other key, or manipulating another user input subsystem 112. Conversely, if all content delivered for display on the client device 100 is by default focusable, all content except the content of interest may be associated with an attribute such that all content except the content of interest is rendered non-focusable. The client application and the content may further be configured to automatically copy the content that is in focus to the device's temporary memory. With reference to FIG. 9, by invoking navigation commands the user may move the focus to the item number 910, which is the content associated with the additional attributes. Focus in FIG. 9 is indicated by the broken box surrounding the item number 910. Other content on the page 900, such as the keyword information 930, the title 940, and the descriptive information 920 is not in focus. When the item number 910 is in focus, there may be a visual change in the display 110 to indicate to the user that this particular piece of content is in focus; for example, it may be highlighted in a different colour, or underlined. The client application may then be configured to automatically select the item number 910 when it is in focus, and/or to automatically copy the item number 910 to temporary memory of the client device 100. If the client is not configured to automatically copy the item number 910 to the temporary memory, then the content may merely be automatically selected, so that the user may then invoke a "copy" command on the device 100 that will then copy the selected content without the user having to actually manipulate an input subsystem 112 to select the content.

Other content may also be rendered focusable in the same manner. With reference to FIG. 10, the descriptive content 1020 is shown as being in focus, while other content such as the keyword information 1030, the title 1040, and the item number 1010 is not. The page 1000 shown in FIG. 10 may represent a later state of the page 900 of FIG. 9, after focus was moved from the item number 910 downwards towards the descriptive information. When the focus is moved to the descriptive information 1020 as shown in FIG. 10, the client application may be configured to automatically select the descriptive information 1020 so that the user may easily invoke a "copy" command; or alternatively, the client application may be configured to automatically copy the descriptive information 1020 to temporary memory as soon as focus is gained by the descriptive information 1020.

Figure 16:
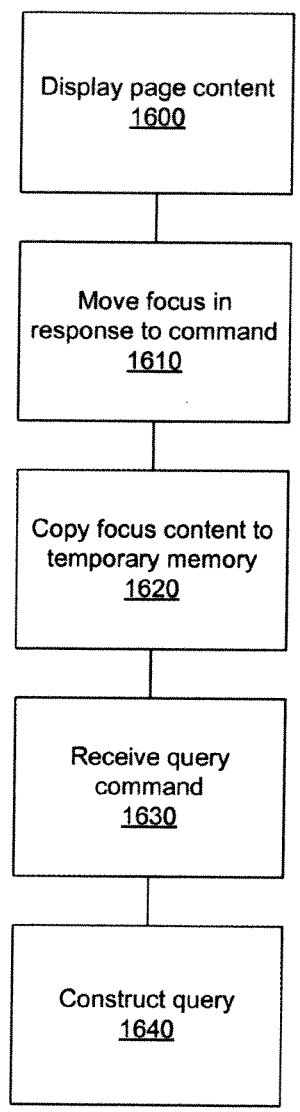
FIG. 16 is a flowchart of a method for copying content for reuse.

Once the content of interest has been copied as described above, the content may then be copied and stored in a separate file for the user's later reference, or it may be used within the client application to further refine the user's most recent query or to commence a new query. For example, once the content of interest has been automatically copied, the user may invoke a further command to cause the client application to automatically apply the copied content to a query, for example if the copied content comprises a search keyword, or an item or record number that can be used to retrieve a record from a database. The command might be invoked by a predefined key press or by manipulating a user input subsystem 112 in a predefined manner, such as depressing a trackball or a return key. Referring to FIG. 16, a simple example of a process for using the automatically copied content is illustrated. At block 1600, the page content is displayed on the device 100. At 1610, the client application receives a command to move the focus on the page to a target piece of content associated with the additional attribute, such as the descriptive information 1020 on the page 1000 of FIG. 10. At 1620, as a result of focus being moved to the content of interest, the content is automatically copied to temporary memory at 1620. If the user then invokes a query command, for example by actuating a predefined key or control, or by actuating a button displayed on the page 1000 (not shown), the client application receives the command at 1630, and in response constructs a query comprising the copied content of interest at 1640.

The query that is constructed at 1640 may be an entirely new query using the copied content of interest as a keyword. If the query command is invoked by the user without the user expressly setting any parameters for the query, the client application may be configured to modify the query in accordance with any stored preferences, as described above with reference to any of FIGS. 12A through 15. Thus, not only is the user able to easily copy content of interest, but the user is also able to initiate a further query based on that copied content with the user's preferred query parameters while avoiding a number of additional steps that would cause delay. This may be particularly useful to the user, particularly when queries for time-sensitive information are being conducted, such as for timed auction listings or stock quotations. In an alternative embodiment, the query constructed at 1640 is not an entirely new query, but the copied content of interest is added to the most recently submitted query as an additional keyword. Thus, the copied content of interest is used to further refine the existing query.

Figure 11:
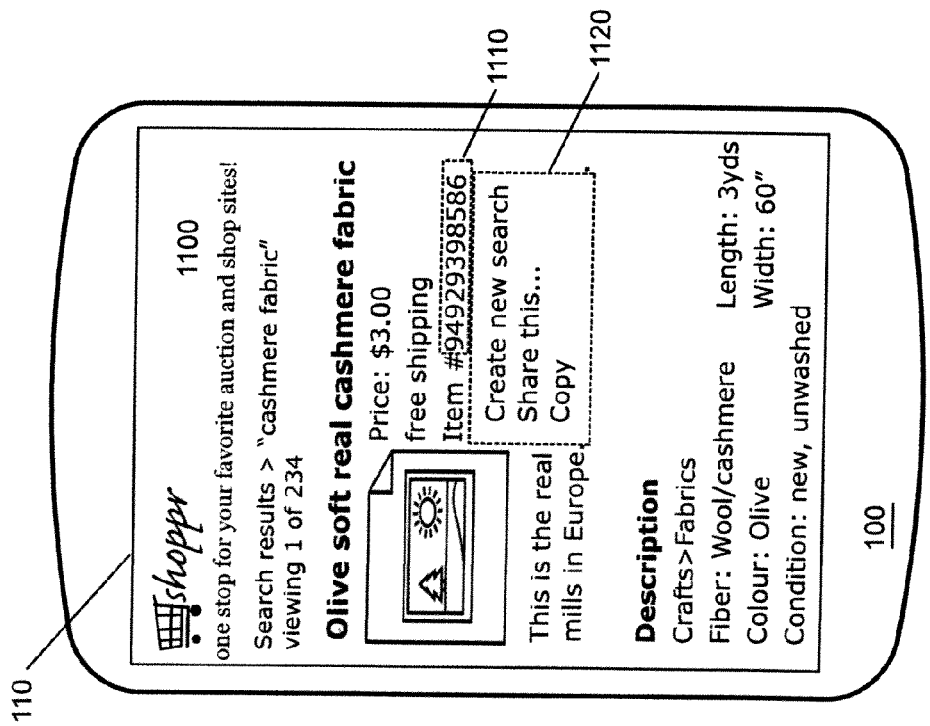
FIG. 11 is a further illustration of a page comprising item information and a user menu on a client device display.

In a further embodiment, the user may make other use of the content having the associated additional attribute. Turning to FIG. 11, the item number 1110 on the page 1100 is shown as being in focus. When the focus is moved to the item number 1110, a dialog box 1120 may be invoked in the client application either automatically or upon user actuation of a command. The dialog box 1120 may provide the user with the option to act on the content of interest in focus, for example by creating a new search, sharing the information using a different client application, or merely copying the content to memory. If the user chooses the new search option, the client application may copy the content in focus and create a query in the manner described above.

If the user chooses the sharing option, the client application may copy the content in focus to memory, and format the content in a particular manner so that it will be associated with its original source, the online service. For example, the client application may construct a uniform resource locator (URL) pointing to the online service comprising the content, and store that URL in memory. The client application or the device 100 may then be configured to launch another application or to directly communicate with a different online service, such as a social networking service, to publish the URL so that it may be used by others. If the content of interest that is incorporated into the URL is the item number 1110, the URL that is constructed may be a URL for invoking a direct search of the online service for that item number, or the URL may be a direct link to an item description page for that item number. If the content of interest that is in focus is descriptive information, the URL that is constructed may only be a URL for invoking a direct search of the online service for that descriptive information as a keyword term. The copied content need not be included in a URL; the client application may instead construct a message or instruction using a different format for data communication or for transmitting an instruction through an API or other interface to the social networking service or other service. Furthermore, if the copied content is used to construct a further search, the search query may be addressed to a different search service than the original online service. For example, if the content was originally received from a first online shopping service, the copied content may then be easily reused to construct a query for another online shopping service.

If the user chooses the copy option, then the content in focus may be copied to temporary memory for the user's other use. As a simple example, the string comprising the copied content may be pasted into a memo pad application. In a further embodiment, the string may be stored in an application registry at the client device 100, registered against the client application in which the copy command was executed. The content may be stored in a file so that the client application can be invoked by the user actuating the file (for example, by double-clicking on the content or on an icon representing the content). In still a further embodiment, the string may be copied to and saved in a different data item. For example, upon copying the string, the string may be saved to a calendar entry in a calendar application, an address book entry in an address book application, a message in a messaging application, or another type of entry in a different data store. When the entry or message is later retrieved and displayed at the client device 100, the client device may search the content of the entry or message to determine whether any string contained therein matches a string stored in the application registry. If a match is found, the string within the entry or message may be configured to be capable of gaining focus and to become actuatable by the user (for example, by clicking on the string); when the string is actuated, it may invoke the launch of the client application in which the copy command was executed, and the string applied to a query to be transmitted by the client application, as described above. Thus, the user may copy and store a keyword or reference number (such as item number 910) of interest in a data store entry in association with another application on the client device 100, and may use that copy of the keyword or number to re-transmit a query at a later time.

The systems and methods disclosed herein are presented only by way of example and are not meant to limit the scope of the invention. Other variations of the systems and methods described above will be apparent to those in the art and as such are considered to be within the scope of the invention.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method implemented at a communication device, the method comprising:
   receiving a first input comprising a first search keyword and at least one explicitly specified parameter value for use in a query to be transmitted to a first online service;
   in response to receiving a search command,
      generating a first query comprising the first search keyword and the at least one explicitly specified parameter value;
      transmitting the first query to the first online service; and
      storing the at least one explicitly specified parameter value in association with the first search keyword at the communication device;
   receiving a second input comprising a second search keyword for use in a query to be transmitted to the first online service or to another online service; and
   in response to receiving a further search command,
      generating a second query comprising the second search keyword;
      in response to determining that the second search keyword matches the first search keyword and that the second input does not include any explicitly specified parameter values, using one or more of the at least one explicitly specified parameter values associated with the first search keyword to modify the second query;
      transmitting the modified second query to the first or other online service.

2. The method of claim 1, wherein when at least one explicitly specified parameter value is included in the second input and the second search keyword matches the first search keyword, the method further comprises storing the at least one explicitly specified parameter value included in the second input in association with the first search keyword in place of the previously stored at least one explicitly specified parameter value.

3. The method of claim 1, wherein the second search keyword is for use in a query to be transmitted to the first online service, and retrieving one or more of the at least one explicitly specified parameter value comprises retrieving all of the at least one explicitly specified parameter value stored in association with the first search keyword.

4. The method of claim 1, wherein the second search keyword is for use in a query to be transmitted to a second online service different from the first online service, and retrieving one or more of the at least one explicitly specified parameter value comprises retrieving those explicitly specified parameter values stored in association with the first search keyword that are acceptable to the second online service.

5. The method of claim 1, wherein the first online service and the other online service comprise shopping e-commerce websites.

6. The method of claim 1, wherein the second input further comprises a third keyword for use in the query, and:
   the second query generated comprises the second and the third search keywords; and
   when the third search keyword matches a previous search keyword used in a previous query comprising at least one explicitly specified parameter value at the communication device, the at least one explicitly specified parameter value of the previous query being stored at the communication device in association with the previous search keyword, the method further comprises retrieving said at least one explicitly specified parameter value of the previous query and automatically modifying the second query to include the at least one explicitly specified parameter value of the previous query as well as the retrieved at least one explicitly specified parameter value stored in association with the first search keyword.

7. The method of claim 1, wherein the first input, the second input and the search commands are received by a web browser application executing on the communication device.

8. The method of claim 7, wherein receiving the second input comprises copying selected content displayed by the communication device, the selected content thus comprising the second search keyword; and generating the second query comprises automatically generating the query upon receipt of the further search command.

9. The method of claim 7, further comprising:
   in response to a copy command, copying selected content displayed by the communication device, the selected content being received from;
   generating an instruction for searching the first or the other online service using the selected content as a search keyword; and
   storing the instruction at the communication device.

10. The method of claim 1, wherein the first query and second query are transmitted over a wireless connection.

11. A communication device, including:
   a memory;
   at least one communications subsystem; and
   at least one processor configured to enable:
      receiving a first input comprising a first search keyword and at least one explicitly specified parameter value for use in a query to be transmitted to a first online service;
      in response to receiving a search command,
         generating a first query comprising the first search keyword and the at least one explicitly specified parameter value;
         transmitting the first query to the first online service; and
         storing the at least one explicitly specified parameter value in association with the first search keyword at the communication device;
      receiving a second input comprising a second search keyword for use in a query to be transmitted to the first online service or to another online service; and
      in response to receiving a further search command,
         generating a second query comprising the second search keyword;
         in response to determining that the second search keyword matches the first search keyword and that the second input does not include any explicitly specified parameter values, using one or more of the at least one explicitly specified parameter values associated with the first search keyword to modify the second query; and
         transmitting the modified second query to the first or other online service.

12. The communication device of claim 11, wherein when at least one explicitly specified parameter value is included in the second input and the second search keyword matches the first search keyword, the processor is configured to enable storing the at least one explicitly specified parameter value included in the second input in association with the first search keyword in place of the previously stored at least one explicitly specified parameter value.

13. The communication device of claim 11, wherein the second search keyword is for use in a query to be transmitted to the first online service, and retrieving one or more of the at least one explicitly specified parameter value comprises retrieving all of the at least one explicitly specified parameter value stored in association with the first search keyword.

14. The communication device of claim 11, wherein the second search keyword is for use in a query to be transmitted to a second online service different from the first online service, and retrieving one or more of the at least one explicitly specified parameter value comprises retrieving those explicitly specified parameter values stored in association with the first search keyword that are acceptable to the second online service.

15. The communication device of claim 11, wherein the second input further comprises a third search keyword for use in the query, and:
the second query generated comprises the second and the third search keywords; and
when the third search keyword matches a previous search keyword used in a previous query comprising at least one explicitly specified parameter value at the communication device, the at least one explicitly specified parameter value of the previous query being stored at the communication device in association with the previous search keyword, the processor is further configured to enable retrieving said at least one explicitly specified parameter value of the previous query and automatically modifying the second query to include the at least one explicitly specified parameter value of the previous query as well as the retrieved at least one explicitly specified parameter value stored in association with the first search keyword.

16. A non-transitory communication device-readable medium bearing code which, when executed by one or more processors of a communication device, causes the communication device to perform the method of:
receiving a first input comprising a first search keyword and at least one explicitly specified parameter value for use in a query to be transmitted to a first online service;
in response to receiving a search command,
generating a first query comprising the first search keyword and the at least one explicitly specified parameter value;
transmitting the first query to the first online service; and
storing the at least one explicitly specified parameter value in association with the first search keyword at the communication device;
receiving a second input comprising a second search keyword for use in a query to be transmitted to the first online service or to another online service; and
in response to receiving a further search command,
generating a second query comprising the second search keyword;
in response to determining that the second search keyword matches the first search keyword and that the second input does not include any explicitly specified parameter values, using one or more of the at least one explicitly specified parameter values associated with the first search keyword to modify the second query; and
transmitting the modified second query to the first or other online service.

17. The non-transitory communication device-readable medium of claim 16, wherein when at least one explicitly specified parameter value is included in the second input and the second search keyword matches the first search keyword, the method further comprises storing the at least one explicitly specified parameter value included in the second input in association with the first search keyword in place of the previously stored at least one explicitly specified parameter value.

18. The non-transitory communication device-readable medium of claim 16, wherein the second search keyword is for use in a query to be transmitted to a second online service different from the first online service, and retrieving one or more of the at least one explicitly specified parameter value comprises retrieving those explicitly specified parameter values stored in association with the first search keyword that are acceptable to the second online service.

19. The non-transitory communication device-readable medium of claim 16, wherein the second input further comprises a third search keyword for use in the query, and:
the second query generated comprises the second and the third search keywords; and
when the third search keyword matches a previous search keyword used in a previous query comprising at least one explicitly specified parameter value at the communication device, the at least one explicitly specified parameter value of the previous query being stored at the communication device in association with the previous search keyword, the method further comprises retrieving said at least one explicitly specified parameter value of the previous query and automatically modifying the second query to include the at least one explicitly specified parameter value of the previous query as well as the retrieved at least one explicitly specified parameter value stored in association with the first search keyword.

20. The non-transitory communication device-readable medium of claim 16, wherein the first input, the second input and the search commands are received by a web browser application executing on the communication device.

21. The non-transitory communication device-readable medium of claim 16, wherein receiving the second input comprises copying selected content displayed by the communication device, the selected content thus comprising the second search keyword; and generating the second query comprises automatically generating the query upon receipt of the further search command.

* * * * *